Figure 1:
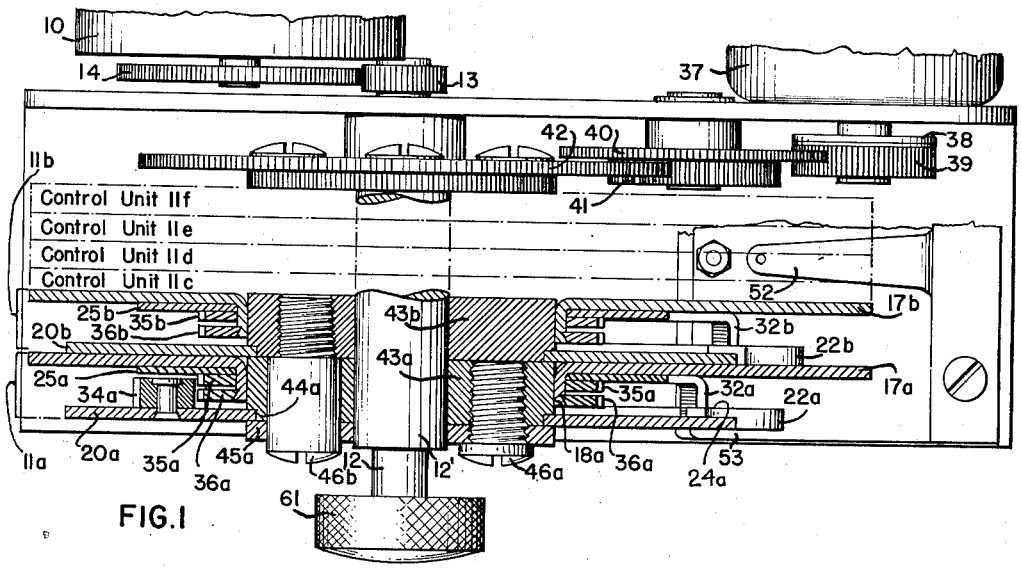

April 1, 1952  H. F. ELLIOTT  2,591,344
APPARATUS FOR POSITIONING ROTARY CONTROLLED ELEMENTS
Filed Sept. 3, 1947  5 Sheets-Sheet 1

INVENTOR.
HAROLD F. ELLIOTT
BY
ATTORNEY

April 1, 1952  H. F. ELLIOTT  2,591,344
APPARATUS FOR POSITIONING ROTARY CONTROLLED ELEMENTS
Filed Sept. 3, 1947  5 Sheets-Sheet 2

*INVENTOR.*
HAROLD F. ELLIOTT
BY *Laurence B Dodds*
ATTORNEY

April 1, 1952        H. F. ELLIOTT        2,591,344

APPARATUS FOR POSITIONING ROTARY CONTROLLED ELEMENTS

Filed Sept. 3, 1947        5 Sheets-Sheet 3

*INVENTOR.*
HAROLD F. ELLIOTT
BY
ATTORNEY

April 1, 1952  H. F. ELLIOTT  2,591,344
APPARATUS FOR POSITIONING ROTARY CONTROLLED ELEMENTS
Filed Sept. 3, 1947  5 Sheets-Sheet 4

INVENTOR.
HAROLD F. ELLIOTT
BY
ATTORNEY

April 1, 1952            H. F. ELLIOTT            2,591,344

APPARATUS FOR POSITIONING ROTARY CONTROLLED ELEMENTS

Filed Sept. 3, 1947            5 Sheets-Sheet 5

INVENTOR.
HAROLD F. ELLIOTT

BY Laurence B. Dodds

ATTORNEY

Patented Apr. 1, 1952

2,591,344

UNITED STATES PATENT OFFICE 2,591,344

APPARATUS FOR POSITIONING ROTARY CONTROLLED ELEMENTS

Harold F. Elliott, Palo Alto, Calif.

Application September 3, 1947, Serial No. 771,999

10 Claims. (Cl. 192—142)

The present invention relates, in general, to apparatus for precisely positioning a rotary controlled element in a predetermined angular position and is especially directed to control apparatus of the so-called "multi-revolution type." By the expression "multi-revolution type" is meant apparatus including a rotary driving element effective to position a rotary controlled element in any selected one of a plurality of predetermined positions, any two of which may have an angular separation represented by rotation of the driving element exceeding one complete revolution.

The invention is subject to a wide range of applications and may be advantageously employed in connection with any electrical or mechanical system having a controlled element to be positioned in any one of several preselected settings. For example, in the fields of radio, radar, television, and facsimile, it is customary to determine an operating condition of the apparatus through the use of a tuning element which may be selectively adjusted. For convenience, the invention will be presented in connection with the selective tuning of a wave- signal radio receiver.

Control systems for accomplishing a desired tuning adjustment of a radio receiver have already been proposed and frequently embody a series of selector cams rotatable over a range slightly less than 180 degrees. Each selector cam includes a stop device, such as a recess, and has an associated cam follower which is provided with a co-operating stop device usually in the nature of a projecting element to register with the stop recess and arrest the rotation of the cam series. The controlled element is directly coupled with a rotatable shaft upon which the series of cams are secured in adjustably fixed positions and selector magnets, or the like, when selectively energized arrest the controlled element in a preselected position determined by the particular cam and follower actuated by the selected magnet.

While control arrangements of that type have been used commercially with great success, it is found that much greater accuracy in the position of the controlled element may be realized by selectively arresting a rotatable driving member in a particular position in a multi-revolution range. The described 180° arrangements do not permit the advantage of that feature.

Other tuning mechanisms have been proposed in an attempt to realize the advantages of the multi-revolution device but they employ the principle of sweeping back and forth through the entire operating range in each tuning cycle to operate selecting and stop mechanisms, mounted on two or more parallel shafts, which conjointly determine the tuning. Such arrangements are bulky, heavy and cumbersome. They are also expensive to build and slow in operation and for those reasons do not attain the perfection possible with the multi-revolution mechanisms to be described herein.

It is an object of the present invention, therefore, to provide an apparatus for precisely positioning a rotary controlled element in a selected angular position and which avoids one or more of the aforementioned limitations of prior arrangements.

It is another object of the invention to provide a new and improved apparatus of the multi-revolution type for dependably, rapidly and accurately positioning a rotary controlled element in a selected angular position.

It is another object of the invention to provide a new and improved apparatus of the multi-revolution type, featuring reduced weight, space, and production cost, for precisely positioning a controlled element in any one of a number of preselected positions.

It is still another object of the invention to provide an improved and simplified apparatus of the multi-revolution type for selectively positioning a controlled element with a high degree of precision at any of a series of selected points within a desired operating range.

A further object of the invention is to provide a multiple revolution positioning mechanism which moves directly and rapidly to "home" position thereby to adjust a controlled element swiftly.

A still further object is to provide a multiple revolution positioning device in which a single production mechanism may be used to attain an operating range of either a few or many turns, thereby affording great flexibility in its application and use.

It is a specific object of the invention to provide in an apparatus of the multi-revolution type for precisely positioning a rotary controlled element in a preselected position, an interlock feature for preventing extraneous and undesired modes of operation.

In accordance with the invention, apparatus for precisely positioning a rotary controlled element in a predetermined angular position comprises a fast member rotatable within a multi-revolution range and including stop provisions. A co-operating stop device is provided, being movable from an inactive position into registration with the stop provisions to arrest the fast member in a predetermined angular position related to the desired predetermined position of the controlled element. The apparatus includes a slow rotatable member in substantially concentric relation with the fast member and controlling the stop device to permit registration with the stop provisions only when the slow member is rotated to a predetermined angular position. Means are included for providing a continuous driving connection from one of the rotatable members to the rotary controlled element and a driving system is also included for simultaneously driving such members at a preselected speed ratio.

For a better understanding of the present invention, together with other and further objects thereof, reference is had to the following description taken in connection with the accompanying drawings, and its scope will be pointed out in the appended claims.

Figure 2:
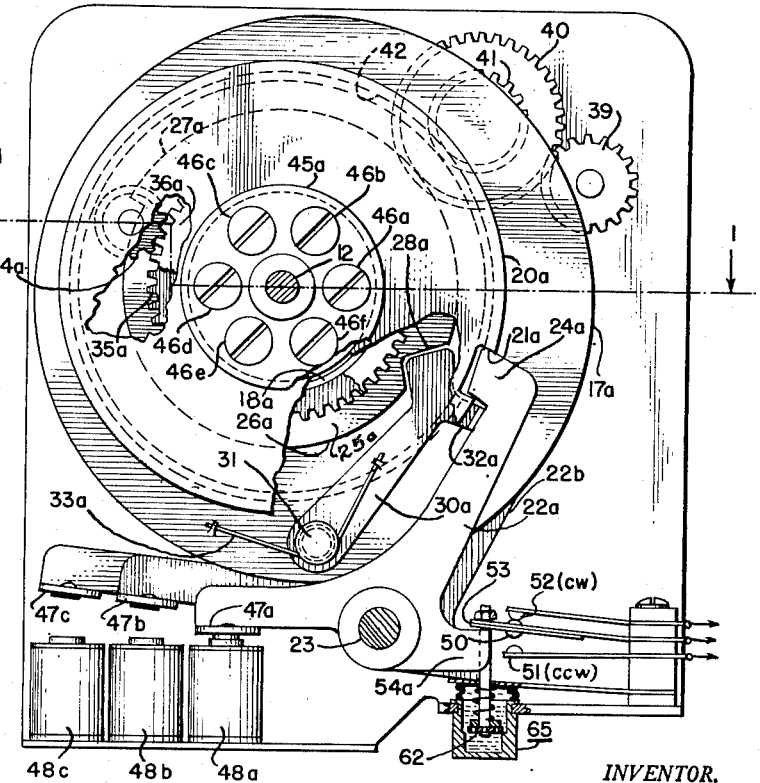
Figure 3:
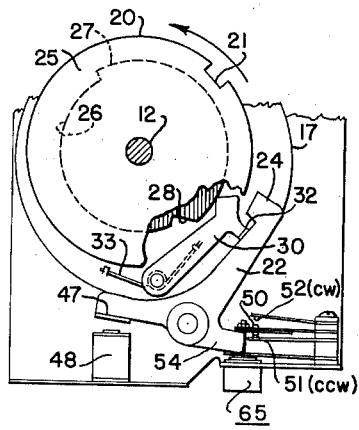
Figure 4:
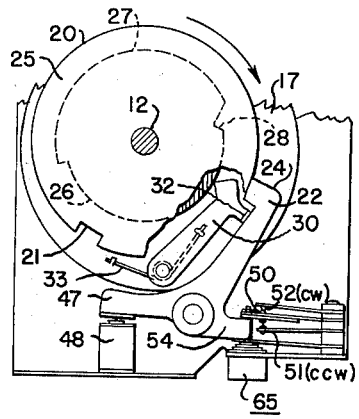
Figure 5:
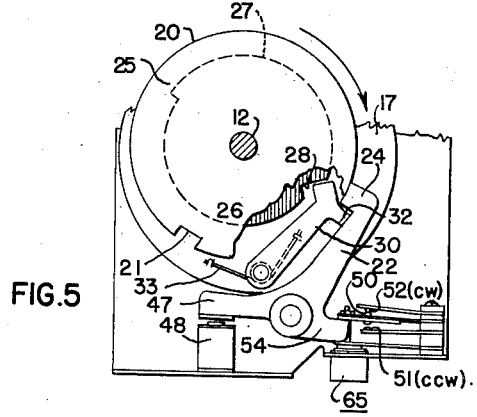
Figure 6:
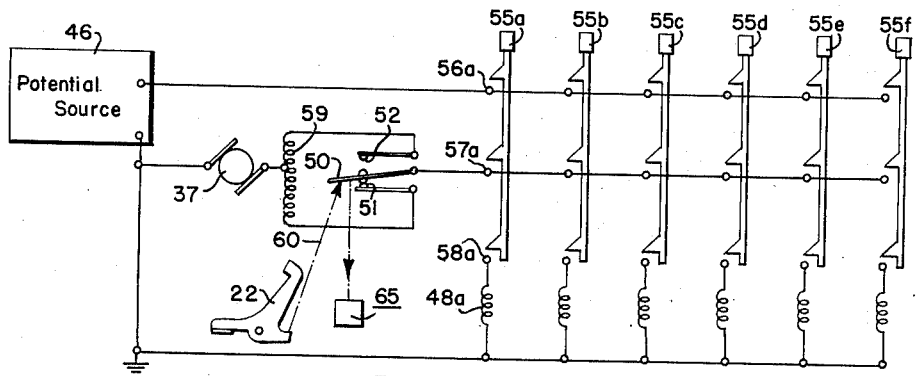
Figure 7:
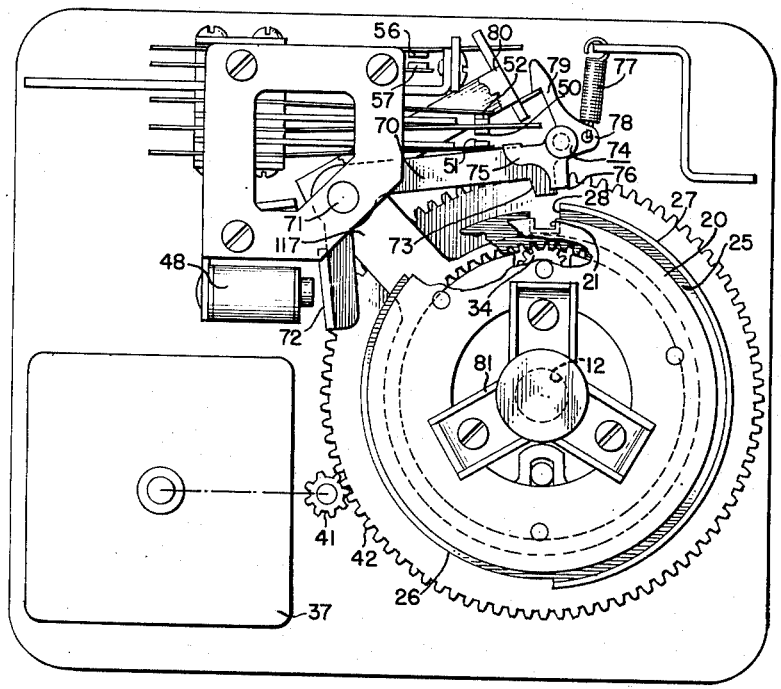
Figures 13, 14:
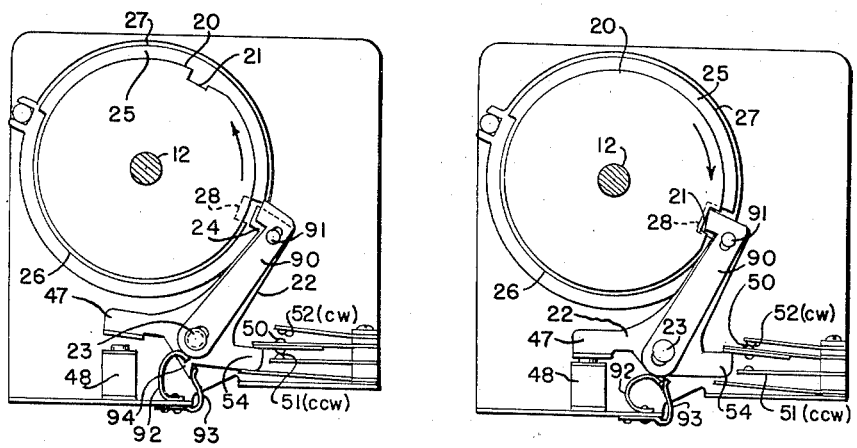
Figure 8:
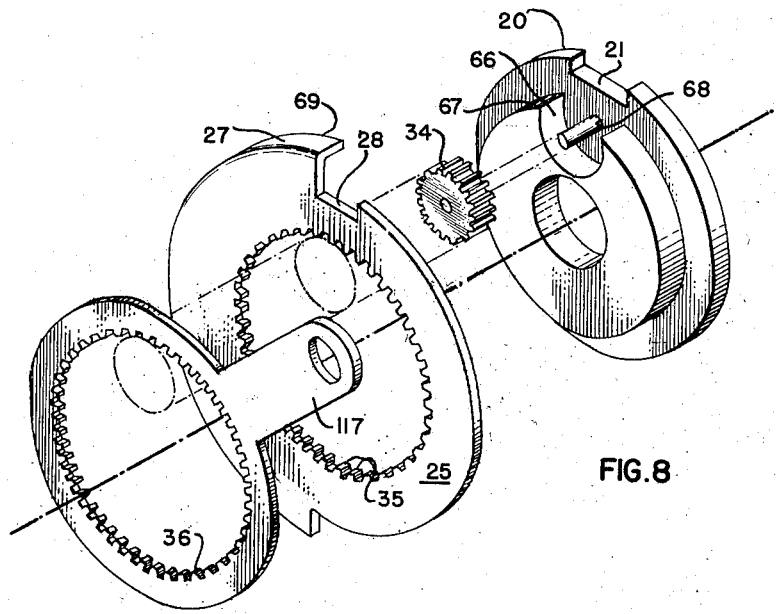

In the drawings, Fig. 1 is a view, partly schematic and partly in cross section, of an apparatus embodying the invention in one form; Fig. 2 is an elevation view of the apparatus of Fig. 1, partially broken away to reveal certain of the mechanical components; Figs. 3, 4, and 5 are schematic representations of different operating conditions of the apparatus, and Fig. 6 is a schematic diagram of a circuit suitable for energizing and controlling the apparatus; Fig. 7 is an elevational view of a modified form of control apparatus in accordance with the invention; Fig. 8 is an exploded isometric view of a portion of the apparatus of Fig. 7; Figs. 9, 10, 11, and 12 are schematic representations utilized in explaining the operation of the Fig. 7 arrangement; while Figs. 13 and 14 represent a further embodiment of the invention.

Referring now more particularly to Figs. 1 and 2, there is represented apparatus in accordance with one embodiment of the invention for precisely positioning a rotary controlled element in a preselected one of a series of predetermined angular positions within its rotational range. While the apparatus is to be described in connection with determining the tuning adjustments of a radio receiver, the receiving system, per se, forms no part of the present invention and, therefore, only its tunable element 10 has been indicated in order to simplify the drawings. Element 10 will be considered as the usual adjustable condenser which determines the operating frequency of the receiver, although, as is well understood, several such condensers may be ganged for simultaneous or unicontrolled adjustment.

In order to realize a selective control of the rotary controlled tuning element 10 as between several available predetermined settings, the apparatus comprises a plurality of control units which are mutually oriented so that each corresponds with an assigned one of the desired tuning settings. The control units are designated 11a–11f, inclusive, in Fig. 1, but since all are of substantially the same construction, only the first two have been shown in section and the remainder are indicated schematically by dash-dot block diagram. The method of illustration chosen simplifies reading the drawing. It shows the structural arrangement of two control units and common or interconnected portions thereof. Each of these control units is adjustably fixed to an enlarged section 12' of a shaft 12 which is rotatable over a range of many revolutions. A gear train 13, 14 connects shaft 12 with tuning element 10, a suitable speed reduction being employed so that rotation of shaft 12 throughout its entire range effects only the desired total displacement of the condenser shaft, usually 180 degrees. By virtue of the connection of shaft 12 with the tuning element, each preselected angular position of the shaft determines and corresponds with a related tuning position of the condenser shaft and a selected operating frequency of the receiver including this condenser.

In describing the construction of the control units, reference will be made to the first such unit 11a, but it will be understood that the description applies equally well to each of the remaining ones. Control unit 11a comprises a fast rotatable member 20a adjustably secured, in a manner to be described hereinafter, to shaft section 12' for concurrent rotation therewith. Member 20a is, therefore, rotatable within a multi-revolution range and is provided on its external periphery with stop provisions which may take the form of a recess 21a clearly shown in Figs. 2 and 3. The control unit also includes a stop device, movable from an inactive position into an active position wherein it is able to engage recess 21a of fast member 20a. This stop device is shown as a bell crank 22a, pivotally supported upon a shaft or rod 23 which is common to all of the control units. One arm of bell crank 22a is provided with a projection 24a proportioned to be received by recess 21a. The projection 24a is movable from an inactive position into registration with recess 21a to arrest member 20a in a preselected angular position related to the predetermined position of shaft 12 and tuning condenser 10 assigned to control unit 11a.

The movement of stop projection 24a is under the control of a slow rotatable member 25a supported in substantially concentric relation with fast member 20a and permitting registration of the stop elements 21a and 24a only when the slow member is rotated to a predetermined angular position. Slow member 25a has a different diameter from that of the fast member and, as represented in Fig. 2, has an average external diameter greater than that of the fast member. It is also in the nature of a cam having a low portion 26a and a high portion 27a, where "low" and "high" indicate the order of cam radius. Each cam section subtends an arc of slightly less than 180 degrees and a stop recess 28a on the external periphery separates the sectors.

In order to extend a control from the slow member to bell crank 22a, the apparatus includes a second and independent stop device 30a pivoted upon a pivot rod 31 common to all of the control units. Stop device 30a may be considered as an independent device because it may be displaced independently of bell crank 22a. An L-shaped projection 32a of stop device 30a extends into engagement with bell crank 22a while a spring 33a exerts a clockwise biasing force on member 30a to position both devices 22a and 30a into a normal position in which they are out of engagement with the fast and slow members 20a and 25a, respectively. The other end of spring 33a is anchored to a flange portion 17a of sleeve 18a, the flange being apertured to slide over rod 31 and hold the sleeve 18a and flange 17a fixed against rotation.

The apparatus further includes a driving system for simultaneously driving the fast and slow members at a preselected speed ratio equal to at least the number of revolutions in the control range of the fast member. The driving system comprises an epicycloid planetary gear system positioned between these rotatable members in coaxial alignment therewith and interconnecting them so that rotation of one effects simultaneous rotation of the other at the desired speed ratio. The epicycloid gear train is provided by a pinion or sun gear 34a freely rotatable on a stud shaft affixed to fast member 20a and is in constant meshing engagement with a rotatable gear 35a secured to slow member 25a and a stationary gear 36a which is welded or otherwise locked to stationary sleeve 18a. In order to introduce a desired speed differential, rotatable gear 35a has more teeth than stationary gear 36a. Where the effective rotational range of shaft 12 is to be thirty revolutions, gear 35a may have sixty-five teeth and gear 36a may have sixty-four teeth, giving a gear ratio of 65:1. The driving system is completed by means for rotating shaft 12 and with it fast member 20a. This means is provided by a reversible motor 37, connected through a conventional slip clutch 38 and a gear train 39–42, inclusive, to shaft 12.

While any of a number of known connecting arrangements may be employed to secure fast member 20a to shaft section 12', the one shown includes a hub 43a attached to the shaft by a press fit. The hub has a shoulder 44a at one end upon which member 20a may be rotated. A washer 45a in conjunction with a clamping screw 46a locks the fast rotatable member 20a to its hub in a preselected angular position and constitutes means for providing a continuous driving connection from one of the rotatable members, specifically from the fast member, to the rotary controlled tuning element 10 through shaft 12.

An extension 47a of bell crank 22a serves as the armature of an associated selector magnet 48a which may be energized to select control unit 11a to establish its assigned setting of condenser 10 through shaft 12.

The invention contemplates direct homing of the fast and slow members to their predetermined positions, that is, a control of the direction of rotation which results in driving such members to their home positions in the shortest possible time. This is accomplished by a switch which is responsive to the orientation of slow member 25a relative to its predetermined position for controlling the direction of rotation of motor 37. The switch is of the two-position type having a movable intermediate resilient contact 50 which may engage either of opposed fixed contacts 51, 52. It will be assumed that the motor circuit completed through contact 51, as described hereinafter, establishes a counter-clockwise (CCW) direction of rotation for the planetary gear system and rotatable members 20a and 25a, while contact 52 establishes an opposite or clockwise (CW) direction of rotation. The engagement of movable contact 50 with its associated fixed contacts 51 and 52 is determined by a switch actuating device in the form of a bail 53, extending over a further extension 54a of bell crank 22a to be engaged thereby and actuated in accordance with the orientation of slow member 25a. The bail 53 similarly extends over the corresponding projections of the bell cranks in each of the remaining control units so that any one selected to control the apparatus may accomplish direct homing. Normally, contact 50 is closed upon contact 51 and is retained therefor small throws of bell crank 22a and bail 53, as shown in Fig. 3. However, greater throws of the bell crank shift contact 50 into engagement with contact 52, as indicated in Fig. 4.

A suitable circuit arrangement for energizing motor 37 and the selector magnets 48 is represented in Fig. 6, where the potential source is schematically indicated at 46. The customary push-button controls 55 are provided, one for each control unit. The push button 55a closes contacts 56a and 57a to complete the motor circuit and also closes a circuit at the contact 58a for energizing a selector magnet 48a. The switch 50—52 is shown connected with a split field winding 59 for motor 37, providing reversible control of the motor rotation. The interconnection of bell crank 22 with the movable contact 50 is represented schematically at 60.

As previously pointed out, the several control units are identical in construction and the elements thus far recited having the designation character a are duplicated in each of the others. It will be noted in Fig. 1, however, that the clamping screw 46b of unit 11b passes through the hub 43a of the preceding unit. In similar manner, the clamping screw for any other unit further along the stack or series passes through the hubs of the preceding ones and is accessible for adjustment at the front of the stack.

In utilizing the described apparatus to position shaft 12 and with it the controlled tuning condenser 10 into any of the several possible preselected positions, it will be understood that the fast and slow rotatable members of each control unit are initially oriented relative to the shaft to correspond with an assigned one of the selectable positions. This orientation may be achieved by first pressing push button 55a and holding it until the apparatus comes to "home" position as illustrated in Fig. 2. Clamping screw 46a is then released and with stop 24a manually held in recess 21a, knob 61 is rotated thus driving shaft 12 to position the rotor of the condenser to a desired setting which may be considered, for example, as that assigned to control unit 11a. The control unit is thus properly oriented and may be fixed in the selected position by driving screw 46a against clamping washer 45a.

Having oriented each of the several control units in the manner described to correspond with the selectable positions of controlled condenser 10, the apparatus may thereafter be employed quickly and precisely to position the condenser into any selected one of its available settings. Alternatively, a knob 61 coupled to shaft 12 enables an operator to tune the receiving apparatus independently of the control units and to tuning conditions other than those assigned to the control units. The remainder of this description, however, will be devoted to tuning operations through the aid of the several control units.

With the apparatus at rest, springs 33 urge all stop devices 30 away from their associated slow members 25 and retain stop devices 22 in their inactive positions out of engagement with fast members 20. Where the apparatus is to position the tuning condenser, the push button 55 for a particular control unit is depressed, completing the energizing circuit for motor 37 and the appropriate selector magnet.

Assuming push button 55a to be actuated, the motor circuit is completed and magnet 48a is energized and attracts its armature 47a, rotating bell crank 22a in a counter-clockwise direction about its pivot 23. The normal engagement of stop devices 22a and 30a, established through projection 32a, causes element 30a to rotate and be brought into engagement with slow member 25a as a cam follower. Depending upon the position of shaft 12 at the time the selector magnet is energized, element 30a will usually engage either the high cam sector 27a of slow member 25a as represented in Fig. 3, or it will meet the low cam sector 26a as indicated in Fig. 4.

If the follower 30a engages high cam portion 27a, there is a limited or restricted resulting rotation of bell crank 22a so that middle switch contact 50 remains in engagement with contact 51, establishing a direction of rotation which is counter-clockwise, as viewed in Fig. 3. With motor 37 energized and the planetary reduction gear system interconnecting the fast and slow members, these members rotate concurrently at a preselected speed ratio, 65:1 for the described planetary system, until slow member 25a arrives at a predetermined angular position in which its recess 28a registers with follower 30a. At that time, the bell crank or stop device 22a moves from its inactive position into engagement with the periphery of fast rotatable member 20a. This added displacement of the bell crank shifts contact 50 to contact 52, reversing the direction of rotation of the driving system. The new condition prevails until stop projection 24a registers with a stop recess 21a of the fast member, locking the entire driving system against further rotation. This locking is effected when rotatable members 20a and 25a have positioned the rotor of condenser 10 through shaft 12 to a preselected point in its rotational range and is permitted by virtue of the slip clutch 38. The representation of Fig. 2 shows both rotatable members in their home positions with the several stop elements in registration.

When the initial orientation of shaft 12 and slow member 25a is such that low cam portion 26a is opposite its follower 30a, as shown in Fig. 4, the first movement of bell crank 22a is sufficient to break the motor circuit at contacts 50, 51 and complete it through contacts 50, 52, initiating a clockwise sense of rotation. The driving system then actuates the control unit until the co-operating stop devices register with one another when the selected position has been reached.

The movement of any bell crank 22 upon the energization of its associated selector magnet performs, in conjunction with the high and low cam portions 26 and 27 of the corresponding slow member, a sensing function to determine the appropriate direction of rotation for direct homing. The expression "direct homing" is used herein and in the appended claims to indicate a direction of rotation which drives the controlled element to its preselected position in the shortest possible time. While the operation as described may be relied upon for many operating conditions, it is desirable to provide an interlock or sequence control arrangement to avoid one possible mode of operation that may, under certain circumstances, result in inaccurate tuning. When tuning between two stations that are very close to one another in the frequency spectrum, it is possible to have an initial condition such as represented in Fig. 5 because each fast member is driven any time shaft 12 rotates and each slow member necessarily follows the rotation of its fast member. Here the expression "initial condition" indicates the setting of the controlled element immediately prior to the actuation of any selector magnet to achieve motor-driven adjustment of condenser 10 to a selected, predetermined position.

It is seen that slow member 25 is substantially in its predetermined position wherein its recess 28 may register with stop device 30 upon energization of selector magnet 48, enabling bell crank 22 to close switch contacts 50, 52. It is also seen that recess 21 of fast member 20 is displaced in a clockwise direction from its co-operating stop projection 24 of stop device 22. Under such initial conditions, in the absence of an interlock or sequence control, a clockwise direction of rotation is established, rather than the desired counter-clockwise rotation, and may result in hunting or in jamming of the planetary drive or an inaccurate setting. This is obviated by providing means for causing an initial rotation of the motor and driving system in a particular direction, specifically, in a counter-clockwise direction for a preselected operating interval short compared with the period of rotation of the slow member. This means may comprise an arrangement of the control circuit such that the motor contacts 56, 57 close slightly before the selector-magnet contact 58. Where that sequence in completing the control circuits is established, switch contacts 50, 51, which are always closed in the "at rest" condition of the apparatus, permit counter-clockwise rotation so that recess 21 of the fast member is driven to the counter-clockwise side of stop projection 24 before the selector magnet is energized to change the direction of rotation. Such a sequence of operations obviates the erroneous operation and possible jamming referred to above.

Essentially the same result may be realized by introducing a delayed action in the operation of the motor reversing switch or its actuator. In Fig. 2, for example, a conventional dash-pot assembly 65 is coupled with the switch-actuating bail 53. This assembly comprises a cylinder and a piston 62, the latter being only slightly smaller in diameter than the lower portion of the cylinder. The upper cylinder portion is enlarged so that the delay corresponds only to the travel time of piston 62 along the reduced-diameter section. The upper end of the piston rod is connected to bail 53 and the cylinder is oil-filled. If desired, ports in the piston, in conjunction with a spring-biased valve plate, may provide a check valve for quick return movement of the piston. In the presence of such a dash-pot, the action of any bell crank 22 in moving center contact 50 from its engagement with contact 51 to contact 52 is delayed for the desired time, assuring an initial brief counter-clockwise rotation of the driving system immediately upon the operation of any push button.

The explanatory schematic representations of Figs. 3, 4, and 5 are general, applying to any control unit, so that the letter designations have been omitted.

A further modification of the sequence control feature of the present invention is represented in Figs. 7–12, inclusive, which, for convenience, represent a single control unit, although it will be understood that any number of such units may be provided in accordance with the number of preselected positions desired for the controlled element. This modified form of control unit is similar in many respects to that previously described and corresponding components thereof are identified by similar characters. This modification features a hypocycloid planetary gear system interconnecting fast rotatable member 20 and slow rotatable member 25 and a single or common stop projection 73 for engaging stop recesses in both of those members to arrest the controlled element in its desired position.

In this embodiment, the rotatable gear 35 and the stationary gear 36 of the planetary system are internal ring gears, as clearly shown in the exploded isometric of Fig. 8. In order more clearly to show the arrangement of the various parts, this view has been taken from the side of the assembly opposite that of the other views and is substantially what would be seen in viewing the apparatus from the rear. The pinion gear 34 is accommodated in a well 66 formed in the hub 67 of fast member 20. It rotates freely on a stud shaft 68 simultaneously to mesh with both of gears 35 and 36. Hub 67 extends through and supports both gears 35 and 36, at the same time being rotatable relative thereto. The slow member 25 may very conveniently be formed integrally with the rotatable gear 35, as illustrated in Fig. 8, and again includes both high and low cam portions 26 and 27 but has a minimum radius which exceeds the maximum radius of fast member 20. The slow member may also have a peripheral flange 69 extending from its cam sectors 26 and 27 to overlap the periphery of fast member 20.

The single stop device is represented as a bell crank 70 pivotally supported on a rod 71 common to all of the control units and serving as an anchor for the extension 117 of each stationary gear 36. The bell crank 70 has a first portion 72 constituting an armature of an associated selector magnet 48. Another part of the bell crank terminates in a projection 73 which constitutes a stop projection that is common to both the fast and slow members and adapted to register with their stop recesses 21 and 28. A spider 74 is pivoted at the free end of projection 73 and has four radially extending arms. The first arm 75 is a rotational stop member; another, 76, provides an extensible portion for stop projection 73; the third, 78, constitutes a conection for the biasing spring 77; while the fourth, 79, having the shape of a pawl, is used as a switch actuator.

Figure 11:
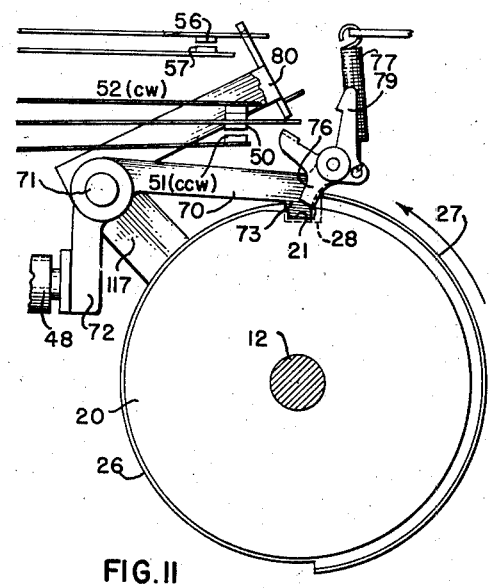

The switch assembly to be controlled by pawl 79 includes the contacts 50, 51, 52 which control the direction of motor rotation and contacts 56, 57 in the supply circuit of the motor. A common bail 80 is arranged to engage the movable contacts 50 and 56, this bail also being pivotally supported on the rod 71. This portion of the present embodiment, comprising the switch assembly and stop device, is essentially the same as that represented in Figs. 11, 14, 15, and 16 of Patent No. 2,299,082 issued to applicant on October 20, 1942, and reference may be had thereto for further constructional details. Figs. 11 and 13 of the reference patent disclose an appropriate stack clamping arrangement for adjustably fixing a series of the control units to shaft 12 so that each fast member 20 rotates with the shaft. This clamp is indicated schematically at 81 in Fig. 7. The shaft is driven from motor 37 through a gear train comprising gears 41 and 42 and including a slip clutch (not shown).

Figure 9:
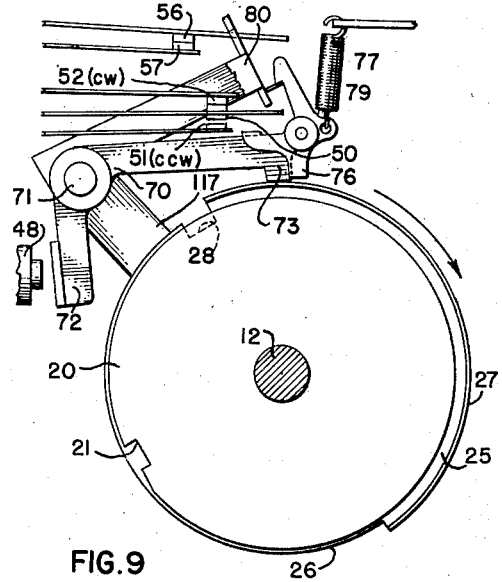

The operation of this modified form of control unit in positioning the controlled condenser 10 through shaft 12 to an assigned point in its rotational range is similar to the operation recited in connection with the first described embodiment. In Fig. 7, the apparatus is shown at rest, spring 77 holding stop projection 73 in its inactive position out of engagement with rotatable members 20 and 25 and opening the motor circuit at contacts 56, 57. Upon the actuation of selector magnet 48, bell crank 70 is rotated in a clockwise direction, bringing the single stop device 73 into engagement with the periphery of slow member 25. The direction of rotation is controlled by the initial orientation of the slow member, since that orientation determines whether the stop device rests upon the high or low cam portions 26 or 27. For convenience, it will be assumed that the stop device engages the high cam portion 27, as indicated in Fig. 9.

Figure 10:
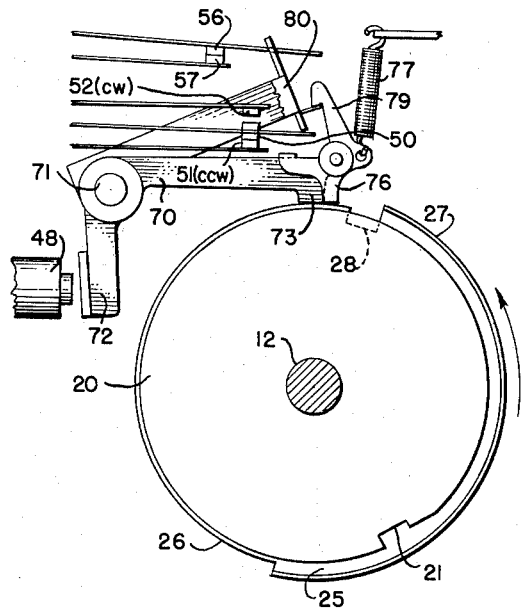

This movement of the stop device causes pawl 79 to draw bail 80 downwardly and close the motor circuit at contacts 56, 57 but retains engagement of contacts 50 and 52, establishing a clockwise direction of rotation. As slow member 25 is driven to its predetermined angular position in which its recess 28 is directly under stop projection 73, it is found that the stop device is not able to register with the recess because its extensible portion 76 is retained in its extended position by spring 77, providing a width for the stop projection which exceeds the recess of the slow member. Therefore, rotation in the clockwise direction continues until high cam portion 27 passes beyond the stop projection, permitting the magnet further to rotate bell crank 70 and rest stop device 73 on low cam portion 26, as indicated in Fig. 10. This added rotation of the bell crank moves center contact 50 into engagement with contact 51 and reverses the direction of rotation. Thereafter, the leading edge of high cam portion 27 of the slow member engages extensible element 76 and partially retracts that element, permitting stop projection 73 to register with recess 28. The counterclockwise rotation of the fast member continues until its recess 21 is also in registration with stop projection 73. At that time, extensible member 76 is fully retracted, as shown in Fig. 11. Pawl 79 releases bail 80 and a spring (not shown) is then able to raise the bail, opening the motor circuit at contacts 56, 57. The stop projection 73 having engaged both stop recesses 21 and 28, locks the driving system against further rotation and the controlled condenser 10 rests in its preselected position assigned to the particular control unit. Thus, it is seen that in this modification, the slow member permits stop projection 73 to arrest the rotation of the fast member and shaft 12 only when the slow member is rotated in a particular direction, specifically counterclockwise, to its predetermined angular position.

Figure 12:
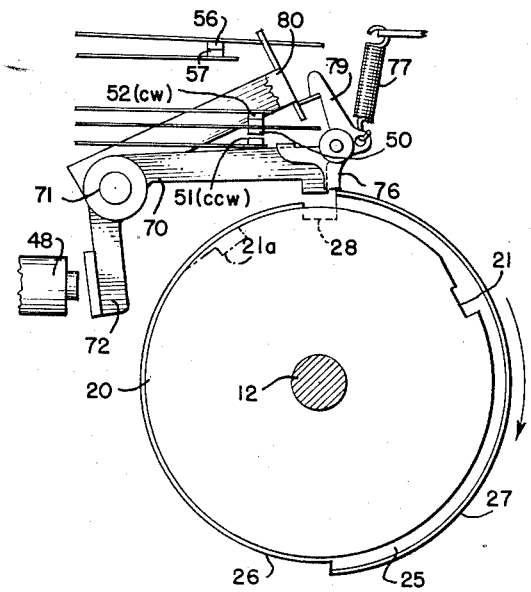

The extensible portion 76 of the stop projection also introduces an interlock or sequence control feature. This will be apparent from the representation of Fig. 12, showing an initial condition in which slow member 25 is at its predetermined angular setting, a condition which may be encountered in tuning the receiver to two closely related operating frequencies. As there represented, recess 21 of fast member 20 is displaced a fraction of a revolution in a clockwise direction from stop projection 73, which is resting on high cam portion 27 and establishing a clockwise direction of rotation for the driving system. The extensible portion 76, by preventing registration of stop projection 73 with recess 28 of the slow member, permits clockwise rotation of the rotatable members until projection 73 drops to low cam portion 26, reversing motor 37 and bringing both stop recesses into engagement with stop projection 73 from the appropriate direction (counter-clockwise). The extensible element 76 produces exactly the same sequence of operation if recess 21 of fast member 20 happens to be on the opposite side of home position at the outset, as represented at 21a in Fig. 12. Without the extensible element, it is apparent that for the last described condition the projection 73 would register immediately with recess 28 of the slow member, causing the members to rotate in a counter-clockwise direction and carrying recess 21 away from home position instead of toward it. Were this to be permitted, the mechanism would jam with continued rotation because the leading edge of high cam portion 27 would abut against the stop projection. However, as already described, the extensible element of the stop projection introduces the proper sequence of operation and is effectively an interlock, preventing the apparatus from entering upon such an erroneous mode of operation.

Figs. 13 and 14 are schematic representations of a further modification of a control unit in accordance with the invention, having the same general construction as that of Figs. 7 and 8 but including a different form of switching arrangement and interlock. The fast rotatable member 20 and the slow rotatable member 25 with its low cam portion 26, as well as high cam portion 27 will be seen to be essentially the same as the corresponding parts of the mechanism of Figs. 7 and 8. However, the single stop device for registering with stop recess 21 of the fast member and stop recess 28 of the slow member is in the nature of a bell crank very much like that of the first-described embodiment shown in Fig. 2. It has the same sort of stop projection 24, an armature portion 47, and a switch actuating section 54. Also, it pivots upon the supporting rod 23.

Sequence control or interlocking is achieved in this case by means of an L-shaped device 90 which has an elongated slot through which the supporting rod 23 extends, and an elongated slot near its upper portion for receiving a pin 91 fixed to bell crank 22. The free end of the L-shaped member has the same general configuration as stop projection 24 and may be considered as an extensible part thereof. A leaf spring 92, abutting against the lower extremity of interlock 90, normally biases the interlock to its uppermost position as shown in Fig. 13, providing an effective width for stop projection 24 exceeding the width of slot 28 of the slow member. A second leaf spring 93, engaging a projection 94 of the bell crank 22, serves normally to retain the bell crank in an inactive position out of engagement with both fast member 20 and slow member 25.

The direction of rotation of the gear system is again under the control of a two-position switch, having a center contact 50 which may engage a first contact 51 to establish a counter-clockwise direction of rotation or, alternatively, it may close against a contact 52 for clockwise rotation. The center contact, which is resilient, normally rests against contact 51.

In operation, this arrangement effects sequence control in essentially the same fashion as the modification of Fig. 7. When the initial conditions represented in Fig. 13 exist, energization of magnet 48 rotates bell crank 22 in a counter-clockwise direction, presenting projection 24 to stop recess 28 because slow member 25 is in its preselected home position. However, the interlock 90, being biased to its uppermost position, prevents registration of stop projection 24 and recess 28. As a consequence, the rotation of the bell crank is restricted, maintaining center contact 50 closed against contact 51 to establish a counter-clockwise direction of rotation. After a limited rotation in that direction, the high cam portion 27 of slow member 25 passes beyond stop projection 24 and its extension so that the bell crank rotates further until the projection 24 rests against low cam portion 26 of the slow member. At that instant, center contact 50 is shifted to close a circuit at contact 52 for clockwise rotation.

Clockwise rotation of the slow member causes the leading edge of its high cam portion 27 to engage the interlock and retract it against the bias of leaf spring 92. Through that action the effective width of stop projection 24 is reduced, enabling registration thereof with recess 28 of the slow member. Finally, recess 21 of the fast member also registers with stop projection 24, arresting rotation of the entire drive system. Fig. 14 represents the relationship of the several critical components when this locking has taken effect to position shaft 12 and, therefore, the controlled condenser in its preselected setting.

Each of the described control units is of the multi-revolution type, featuring the advantages recited in the introductory portion of this description. The concentric relationship of the fast and slow members minimizes the space requirements and also simplifies, to a large extent, the mechanical construction of the entire control apparatus. In each case an interlock precludes possible jamming or an undesired mode of operation, assuring dependable and precise positioning of the controlled element in each of its several available preselected positions.

It has been convenient, in both the drawings and description, to discuss a two-position switch 50—51—52 for controlling the direction of rotation of the driving system but the arrangement is not limited in that respect. Relay circuits, for example, are also applicable to accomplish that function. Further, as described in Patent 2,299,082 referred to above, it may be desirable to include a muting circuit so that the controlled receiver is effectively disabled during the tuning operation.

The "direct homing" feature of the described arrangements is important because it permits the tuning to be accomplished in a very short time. That aspect of the mechanism is under the direct control of the slow member and may be adapted even when the slow and fast members are affixed to separate shafts with conventional speed-reducing gearing therebetween. However, it is preferred that both members be carried by the same shaft to reduce the bulk and size of the apparatus.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for precisely positioning a rotary controlled element in a predetermined angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member in coaxial adjacent relation with said fast member, rotatable only within a range not exceeding one revolution, and controlling said stop device to permit registration with said stop provisions only when said slow member is rotated to a predetermined angular position; means for providing a continuous driving connection from one of said members to said rotary controlled element; a planetary gear system positioned in coaxial alignment between and interconnecting said members so that rotation of one effects simultaneous rotation of the other at a preselected speed ratio equal to at least the number of revolutions in said multi-revolution range; and a driving system for rotating one of said members.

2. Apparatus for precisely positioning a rotary controlled element in a predetermined angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member in coaxial adjacent relation with said fast member, rotatable only within a range not exceeding one revolution, and controlling said stop device to permit registration with said stop provisions only when said slow member is rotated to a predetermined angular position; means for providing a continuous driving connection from one of said members to said rotary controlled element; a hypocycloid planetary gear system positioned in coaxial alignment between and interconnecting said members so that rotation of one effects simultaneous rotation of the other at a preselected speed ratio equal to at least the number of revolutions in said multi-revolution range; and a driving system for rotating one of said members.

3. Apparatus for precisely positioning a rotary controlled element in a predetermined angular position comprising: a fast rotatable member rotatable within a multi-revolution range and including stop provisions; a first stop device movable from an inactive position into registration with said stop provisions to arrest said fast member in a preselected angular position related to said predetermined position; a slow rotatable member in coaxial adjacent relation with said fast member and including stop provisions; a second independent stop device responsive to rotation of said slow member to a particular angular position to register with said stop provisions thereof and release said first device for registration with said stop provisions of said fast member; means for providing a continuous driving connection from one of said members to said rotary controlled element; a planetary gear system positioned in coaxial alignment between and interconnecting said members so that rotation of one effects simultaneous rotation of the other at a preselected speed ratio equal to at least the number of revolutions in said multi-revolution range; and a driving system for rotating one of said members.

4. Apparatus for precisely positioning a rotary controlled element in a predetermined angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member controlling said stop device to permit registration with said stop provisions only when said slow member is rotated to a predetermined angular position; means for providing a continuous driving connection from one of said members to said rotary controlled element; a reversible driving system for simultaneously driving said members at a preselected speed ratio, said driving system including a planetary gear system positioned in coaxial alignment between and interconnecting said members so that rotation of one effects simultaneous rotation of the other at a preselected speed ratio equal to at least the number of revolutions in said multi-revolution range and including also sensing means responsive to the orientation of said slow member relative to said predetermined position thereof for controlling the direction of rotation of said driving system to effect direct homing of said slow member to said predetermined position; and means, effective when said slow member is initially in said predetermined position, for establishing a particular direction of rotation of said driving system for an interval small relative to the period of said slow member.

5. Apparatus for precisely positioning a rotary controlled element in a predetermined angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member controlling said stop device to permit registration with said stop provisions only when said slow member is rotated to a predetermined angular position; means for providing a continuous driving connection from one of said members to said rotary controlled element; a reversible driving system for simultaneously driving said members at a preselected speed ratio, said driving system including a planetary gear system positioned in coaxial alignment between and interconnecting said members so that rotation of one effects simultaneous rotation of the other at a preselected speed ratio equal to at least the number of revolutions in said multi-revolution range and including also sensing means responsive to the orientation of said slow member relative to said predetermined position thereof for controlling the direction of rotation to effect direct homing of said slow member to said predetermined position; and means for causing rotation of said driving system in a particular direction for a preselected operating interval, short compared with the period of said slow member, irrespective of the initial orientation of said slow member.

6. Apparatus for precisely positioning a rotary controlled element in a predetermined angular position comprising: a fast rotatable member rotatable within a multi-revolution range and including stop provisions; a stop device movable from an inactive position into registration with said stop provisions to arrest said fast member in a preselected angular position related to said predetermined position; a slow rotatable member controlling said stop device to permit registration with said stop provisions only when said slow member is rotated to a predetermined angular position; means for providing a continuous driving connection from one of said members to said rotary controlled element; a reversible driving system for simultaneously driving said members at a preselected speed ratio, said driving system including a planetary gear system positioned in coaxial alignment between and interconnecting said members so that rotation of one effects simultaneous rotation of the other at a preselected speed ratio equal to at least the number of revolutions in said multi-revolution range and including also switching means tending to establish a particular direction of rotation of said driving system; an actuating device for said switching means establishing an opposite direction of rotation when said slow member is in said predetermined position; and an interlock effective when said slow member is initially in said predetermined position to delay the operation of said actuating device for a selected time interval.

7. Apparatus for precisely positioning a rotary controlled element in a predetermined angular position comprising: a fast member rotatable within a multi-revolution range, including stop provisions and having a hub portion; a stop device movable from an inactive position into registration with said stop provisions to arrest said fast member in a preselected angular position related to said predetermined position; a slow rotatable member having an internal gear rotatably supported on said hub portion and including stop provisions effective, when said slow member is rotated to a predetermined angular position, to permit said stop device to register with said stop provisions of said fast member; a stationary member having an internal gear within which said hub portion rotates; a freely rotating pinion gear supported by said fast member in meshing engagement with said internal gears of said slow member and said stationary member to complete a driving connection for effecting concurrent rotation of said fast and slow members; means for providing a driving connection from one of said fast and slow members to said rotary controlled element; and a driving system for driving one of said fast and slow members.

8. Apparatus for precisely positioning a rotary controlled element in a predetermined angular position comprising: a fast member rotatable within a multi-revolution range, including stop provisions and having a hub portion provided with a recess; a stop device movable from an inactive position into registration with said stop provisions to arrest said fast member in a preselected angular position related to said predetermined position; a slow rotatable member having an internal gear rotatably supported on said hub portion and including stop provisions effective, when said slow member is rotated to a predetermined angular position, to permit said stop device to register with said stop provisions of said fast member; a stationary member having an internal gear within which said hub portion rotates; a freely rotating pinion gear supported within said recess of said hub portion in meshing engagement with said internal gears of said slow member and said stationary member to complete a driving connection for effecting concurrent rotation of said fast and slow members; means for providing a driving connection from one of said fast and slow members to said rotary controlled element; and a driving system for driving one of said fast and slow members.

9. Apparatus for precisely positioning a rotary controlled element in a predetermined angular position comprising: a fast member rotatable within a multi-revolution range, including stop provisions and having a hub portion provided with a recess; a stop device movable from an inactive position into registration with said stop provisions to arrest said fast member in a preselected angular position related to said predetermined position; a slow rotatable member having an internal gear rotatably supported on said hub portion and including stop provisions effective, when said slow member is rotated to a predetermined angular position, to permit said stop device to register with said stop provisions of said fast member; a stationary member having an internal gear with less teeth than said internal gear of said slow member and within which said hub portion rotates; a freely rotating pinion gear supported within said recess of said hub portion in meshing engagement with said internal gears of said slow member and said stationary member to complete a driving connection for effecting concurrent rotation of said fast and slow members; means for providing a driving connection from one of said fast and slow members to said rotary controlled element; and a driving system for driving one of said fast and slow members.

10. Apparatus for precisely positioning a rotary controlled element in a predetermined angular position comprising: a fast member rotatable within a multi-revolution range, including stop provisions and having a hub portion provided with a recess; a stop device movable from an inactive position into registration with said stop provisions to arrest said fast member in a preselected angular position related to said predetermined position; a slow rotatable member having an internal gear rotatably supported on said hub portion and including stop provisions effective, when said slow member is rotated to a predetermined angular position, to permit said stop device to register with said stop provisions of said fast member; a stationary member having an internal gear with one less tooth than said internal gear of said slow member and within which said hub portion rotates; a freely rotating pinion gear supported within said recess of said hub portion in meshing engagement with said internal gears of said slow member and said stationary member to complete a driving connection for effecting concurrent rotation of said fast and slow members; means for providing a driving connection from one of said fast and slow members to said rotary controlled element; and a driving system for rotating said fast member.

HAROLD F. ELLIOTT.

REFERENCES CITED

The following references are of record in the file of this patent:

UNITED STATES PATENTS

| Number | Name | Date |
| --- | --- | --- |
| 1,795,420 | Beall | Mar. 10, 1931 |
| 2,249,753 | Elliott | July 22, 1941 |
| 2,285,414 | Collins | June 9, 1942 |
| 2,299,082 | Elliott | Oct. 20, 1942 |
| 2,389,350 | Exner | Nov. 20, 1945 |
| 2,391,470 | May | Dec. 25, 1945 |
| 2,526,152 | Paessler | Oct. 17, 1950 |